(12) United States Patent
Baughman et al.

(10) Patent No.: US 12,530,361 B2
(45) Date of Patent: Jan. 20, 2026

(54) GENERATION OF REASONING FOR ASSET RANKINGS

(71) Applicant: International Business Machines Corporation, Armonk, NY (US)

(72) Inventors: Aaron K. Baughman, Research Triangle Park, NC (US); Eduardo Morales, Yorktown Heights, NY (US); Rahul Agarwal, New York, NY (US); Chandankumar Johakhim Patel, Columbus, OH (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/352,823

(22) Filed: Jul. 14, 2023

(65) Prior Publication Data

US 2025/0021569 A1 Jan. 16, 2025

(51) Int. Cl.
*G06F 16/2457* (2019.01)

(52) U.S. Cl.
CPC .............. *G06F 16/24578* (2019.01)

(58) Field of Classification Search
None
See application file for complete search history.

(56) References Cited

U.S. PATENT DOCUMENTS

| | | | |
|---|---|---|---|
| 10,679,011 B2 | 6/2020 | Galitsky | |
| 10,825,227 B2 | 11/2020 | Amer et al. | |
| 2006/0036462 A1* | 2/2006 | King | G06Q 20/4012 705/901 |
| 2017/0109015 A1* | 4/2017 | Krasadakis | G06F 16/335 |
| 2021/0158227 A1 | 5/2021 | Budzik et al. | |
| 2022/0005041 A1 | 1/2022 | Chang et al. | |

FOREIGN PATENT DOCUMENTS

CN 102375869 B 9/2017

OTHER PUBLICATIONS

Anand et al., Explainable Information Retrieval: A Survey, Leibniz University, Hanover, Germany, Nov. 4, 2022.
Dutra, Asset management in mining, a practical case on obtaining a reliable performance, risk and cost measurements, samarco.com, Jan. 2013.

(Continued)

*Primary Examiner* — Taelor Kim
(74) *Attorney, Agent, or Firm* — CHIP LAW GROUP

(57) ABSTRACT

An example operation may include one or more of executing queries on one or more external data stores to retrieve domain data of one or more ranked lists of assets and variables corresponding to the domain data, generating a plurality of feature groups based on the retrieved domain data and variables, wherein the plurality of feature groups correspond to a plurality of features used to generate the one or more ranked lists, converting the plurality of features groups into a plurality of values via execution of an optimization engine, transforming the plurality of values into a plurality of sentences describing the plurality of feature groups, and displaying the plurality of sentences via a user interface.

13 Claims, 10 Drawing Sheets

(56) References Cited

OTHER PUBLICATIONS

Ellis et al., Algorithm-Agnostic Explainability for Unsupervised Clustering, the Tri-institutional Centre for Translational Research in Neuroimaging and Data Science, Georgia State University, Georgia Institute of Technology and Emory University, Atlanta, Georgia, Aug. 28, 2021.

Gao et al., A Comprehensive Assessment Method of Asset Importance for Key Asset Protection, ICCNS 2019: Proceedings of the 2019 the 9th International Conference on Communication and Network Security, Nov. 2019, pp. 79-83, https://doi.org/10.1145/3371676.3371679.

Gómez et al., Risk-Based Criticality for Network Utilities Asset Management, IEEE Transactions on Network and Service Management, vol. 16, No. 2, Jun. 2019, pp. 755-768.

Huang et al., Study on an Approach for Ranking the Critical Information Assets, 2009 Chinese Control and Decision Conference, date of conference: Jun. 17-19, 2009, Date added to IEEE Aug. 7, 2009, Abstract only.

Klaise et al., Monitoring and Explainability of Models in Production, Jul. 13, 2020.

Plagwitz et al., Supporting AI-Explainability by Analyzing Feature Subsets in a MachineLearning Model, a Institute of Medical Informatics, University of Münster, Germany, Challenges of Trustable AI and Added-Value on HealthB. Séroussi et al. (Eds.) © 2022 European Federation for Medical Informatics (EFMI) and IOS Press. This article is published online with Open Access by IOS Press and distributed under the terms of the Creative Commons Attribution Non-Commercial License 4.0 (CC BY-NC 4.0).doi:10.3233/SHTI220406, May 1, 2022.

Sen et al., The Curious Case of IR Explainability: Explaining Document Scores within and across Ranking Models, Short Research Papers II, SIGIR '20, Jul. 25-30, 2020, Virtual Event, China.

Singh et al., Extracting per Query Valid Explanations for Blackbox Learning-to-Rank Models, Session 3A—Queries, ICTIR '21, Jul. 11, 2021, Virtual Event, Canada.

Wambsganss et al., Improving Explainability and Accuracy through Feature Engineering: A Taxonomy of Features in NLP-based Machine Learning, Forty-Second International Conference on Information Systems. 2021.

Zini et al., On the Explainability of Natural Language Processing Deep Models, Department of Electrical and Computer Engineering, American University of Beirut, Oct. 13, 2022.

\* cited by examiner

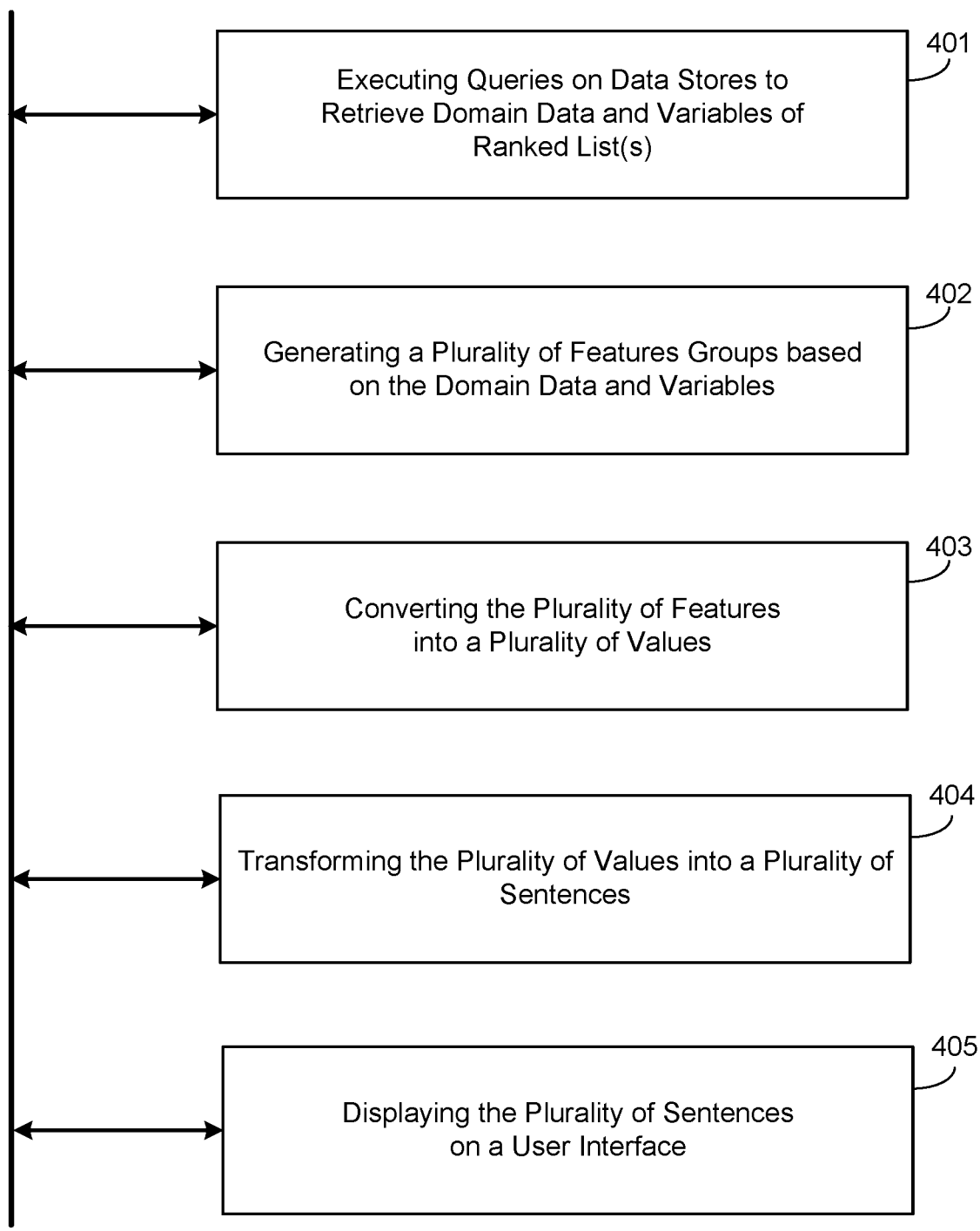

GENERATION OF REASONING FOR ASSET RANKINGS

BACKGROUND

Items or individuals are often ranked in certain environments. For example, sports teams, goods, topics, and other assets can be ranked with respect to one another. However, many rankings do not explain how they are derived and thus an observer can have a difficult time understanding the reasoning for certain rankings and may struggle to compare one ranking list to another.

SUMMARY

One example embodiment provides an apparatus that includes a processor that may perform one or more of execute queries on one or more external data stores to retrieve domain data of one or more ranked lists of assets and variables that correspond to the domain data, generate a plurality of feature groups based on the retrieved domain data and variables, wherein the plurality of feature groups correspond to a plurality of features used to generate the one or more ranked lists, convert the plurality of features groups into a plurality of values via execution of an optimization engine, transform the plurality of values into a plurality of sentences that describe the plurality of feature groups, and display the plurality of sentences via a user interface.

Another example embodiment provides a method that includes one or more of executing queries on one or more external data stores to retrieve domain data of one or more ranked lists of assets and variables corresponding to the domain data, generating a plurality of feature groups based on the retrieved domain data and variables, wherein the plurality of feature groups correspond to a plurality of features used to generate the one or more ranked lists, converting the plurality of features groups into a plurality of values via execution of an optimization engine, transforming the plurality of values into a plurality of sentences describing the plurality of feature groups, and displaying the plurality of sentences via a user interface.

A further example embodiment provides a computer program product comprising a computer readable storage medium having stored thereon instructions, that when executed by a processor, cause the processor to perform one or more of executing queries on one or more external data stores to retrieve domain data of one or more ranked lists of assets and variables corresponding to the domain data, generating a plurality of feature groups based on the retrieved domain data and variables, wherein the plurality of feature groups correspond to a plurality of features used to generate the one or more ranked lists, converting the plurality of features groups into a plurality of values via execution of an optimization engine, transforming the plurality of values into a plurality of sentences describing the plurality of feature groups, and displaying the plurality of sentences via a user interface.

BRIEF DESCRIPTION OF THE DRAWINGS

FIG. 4A is a diagram illustrating a method of determining and explaining reasoning for asset rankings according to example embodiments.

DETAILED DESCRIPTION

Figure 1:
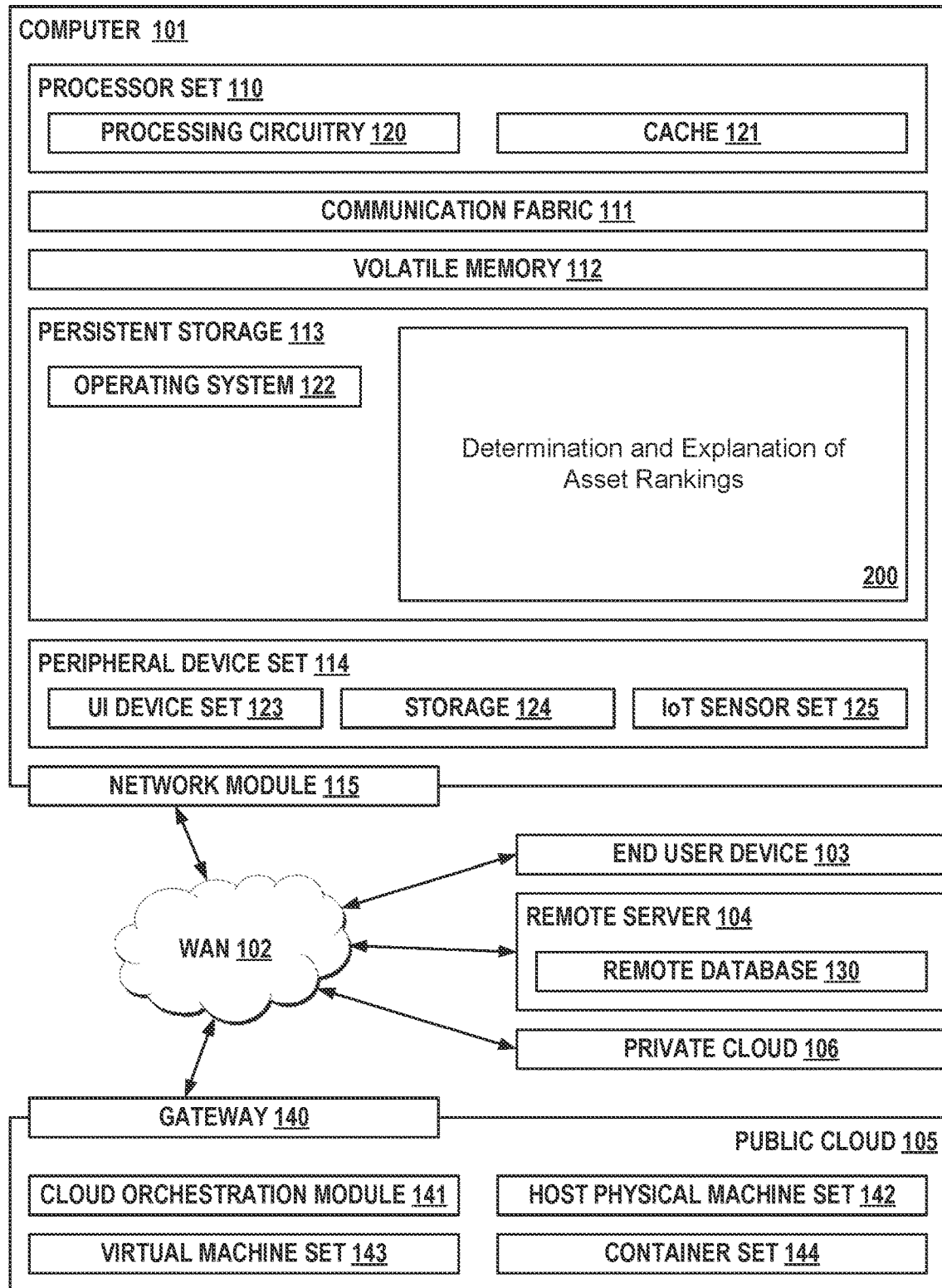
FIG. 1 depicts a computing environment, according to example embodiments.

It is to be understood that although this disclosure includes a detailed description of cloud computing, implementation of the teachings recited herein is not limited to a cloud computing environment. Rather, embodiments of the instant solution are capable of being implemented in conjunction with any other type of computing environment now known or later developed.

The example embodiments are directed to a system and method to infer the reasoning behind a ranked list of assets based on available data associated with the list. If the data cannot exactly fit the rankings, residual variables may be used to fill in the uncertainty while combinatorial optimization may be used to fit the derived predictors. A power ranking that contains the residual variables and one without will be generated and displayed to a user such as via a user interface of a software application. A bridge ranking system is created to create comparable many-to-one and one-to-many relationships between different sets of rankings from the same domain. Further, synthesized explanations (e.g., sentences of text, etc.) may be output and may clearly state why each asset has a certain valuation. Consumers will be able to compare vendors that list the same products, understand value differences between groups, and align consumer mental maps to other group mental maps.

Some of the benefits of the bridge ranking system described herein are the ability to create comparable lists or ranked assets and understanding between vendors and groups. The unknown can better be understood by synthesizing the uncertainty from all of the different ranked lists. The system may also provide reverse asset ranks with available data that is incongruent with original predictors and features. Further, the system may create sentences from correlational measures between normalized residual ranks. The system may combine variables/factors across disparate domains while keeping relativity intact. A machine learning model (e.g., neural network, etc.) may be used to generate informative synthetic sentences that explain the ranking. Furthermore, the system may combine residual rankings to create a child ranking from the combined rankings. Thus, a viewer can be provided with the original ranking and a more normalized ranking.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure, including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure, including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer can deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community with shared concerns (e.g., mission, security requirements, policy, and compliance considerations). It may be managed by organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Referring now to FIG. 1, a computing environment 100 is depicted. Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again, depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for executing at least some of the computer code involved in performing the inventive methods, such as determination and explanation of asset rankings 200. In addition to block 200, computing environment 100 includes, for example, computer 101, wide area network (WAN) 102, end-user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smartphone, smartwatch or other wearable computer, mainframe computer, quantum computer or any other form of computer or mobile device now known or to be developed in the future that can run a program, accessing a network or querying a database, such as remote database 130. As is well understood in the art of computer technology, and depending upon the technology, the performance of a computer-implemented method may be distributed among multiple computers and/or between multiple locations. On the other hand, in this presentation of the computing environment 100, a detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is a memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off-chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric comprises switches and electrically conductive paths, such as the switches and electrically conductive paths that make up buses, bridges, physical input/output ports, and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read-only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the Internet. In various embodiments, UI device set 123 may include components such as a display screen, speaker, microphone, wearable devices (such as goggles and smartwatches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the Internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the Internet) capable of communicating computer data over non-local distances by any technology for communicating computer data now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer, and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, this data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs, and manages active instantiations of VCE deployments. Gateway 140 is the collection of computer software, hardware, and firmware that allows public cloud 105 to communicate through WAN 102.

Some further explanations of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as communicating with WAN 102, in other embodiments, a private cloud may be disconnected from the Internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both parts of a larger hybrid cloud.

Items, individuals or teams can be ranked differently by different entities. For example, a tennis player's ranking can be determined using a multitude of different factors based on the league or tournament the player is participating in. Various sites may use more, less, or different factors to rank goods and thus what is needed is an efficient comparison process and an understanding of the methodology producing the comparison results.

Figure 2A:
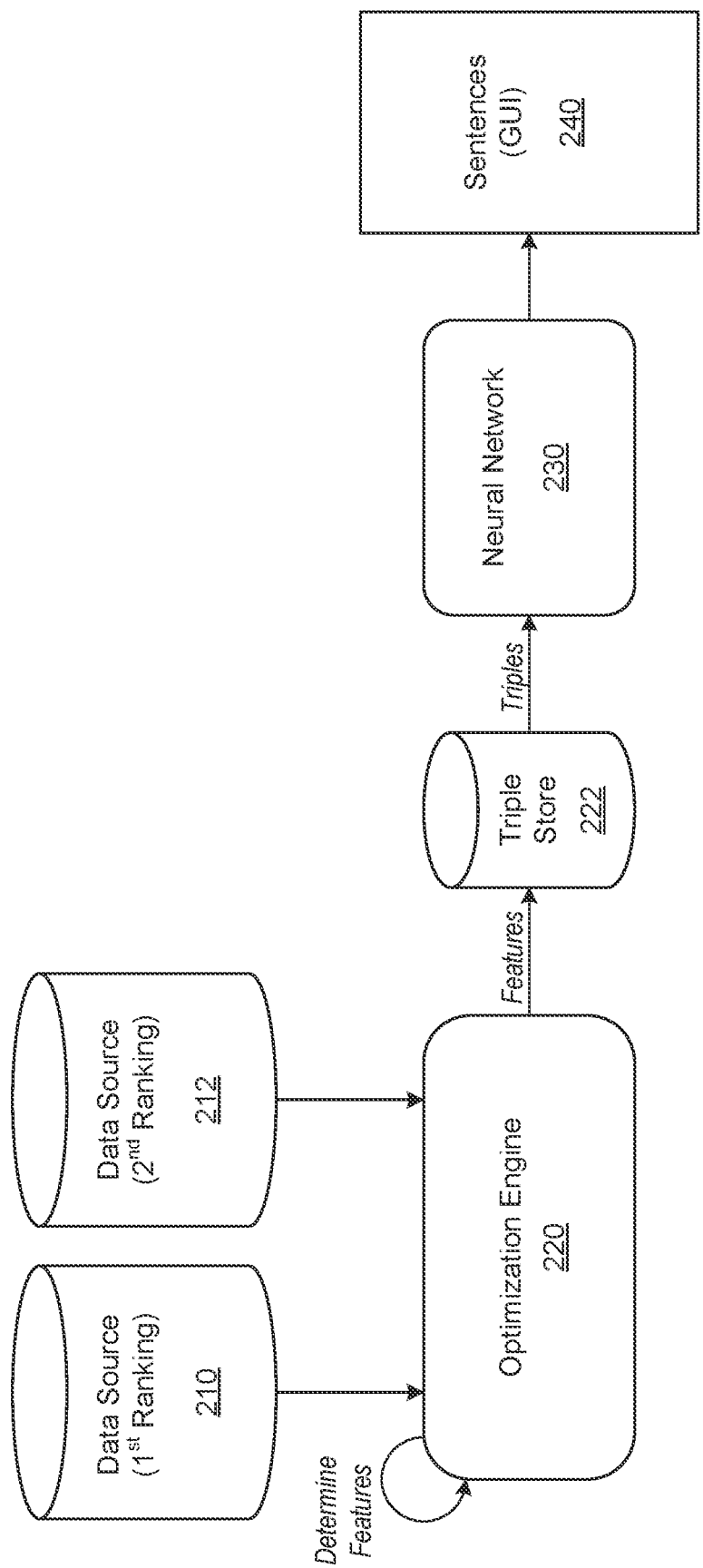
FIG. 2A is a diagram illustrating a process for inferring and comparing the reasoning for ranked lists of assets according to example embodiments.

FIG. 2A illustrates a process 202 of inferring and comparing the reasoning for ranked lists of assets according to example embodiments. Referring to FIG. 2A, an optimization engine 220 may be hosted by a host platform such as a cloud platform, a web server, a database, a distributed network of devices/systems, and the like. The optimization engine 220 may retrieve data from one or more external data sources, such as data source 210 and data source 212. The retrieved data may include data such as variables and features that are associated with ranked lists of assets that are generated and provided by the data sources 210 and 212, respectively. This data may be made available by the data sources 210 and 212, for example, via a respective application programming interface (API).

Figure 2B:
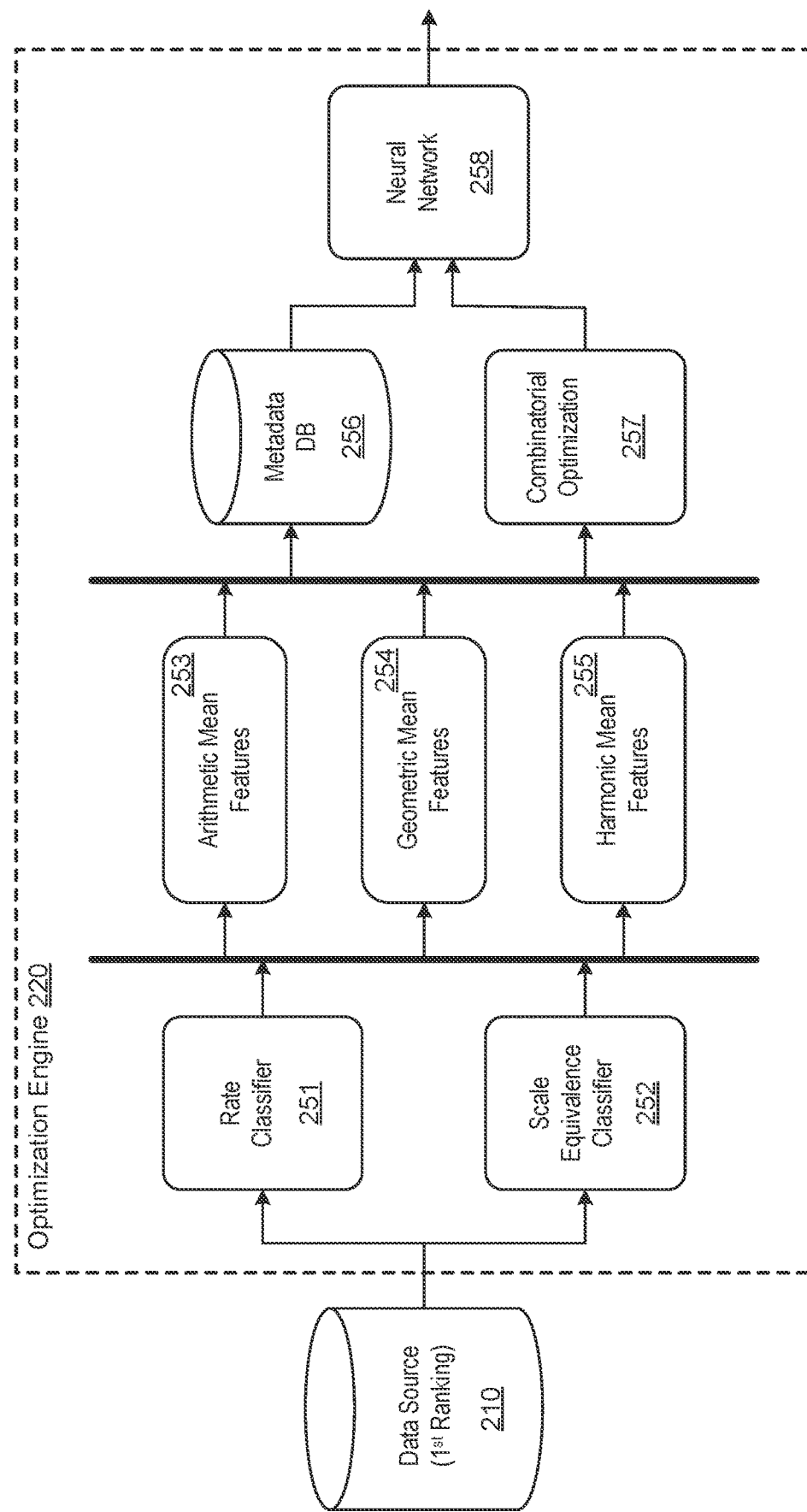
FIGS. 2B-2C are diagram illustrating examples of an optimization engine for inferring and comparing the reasoning for ranked lists of assets according to example embodiments.
Figure 2C:
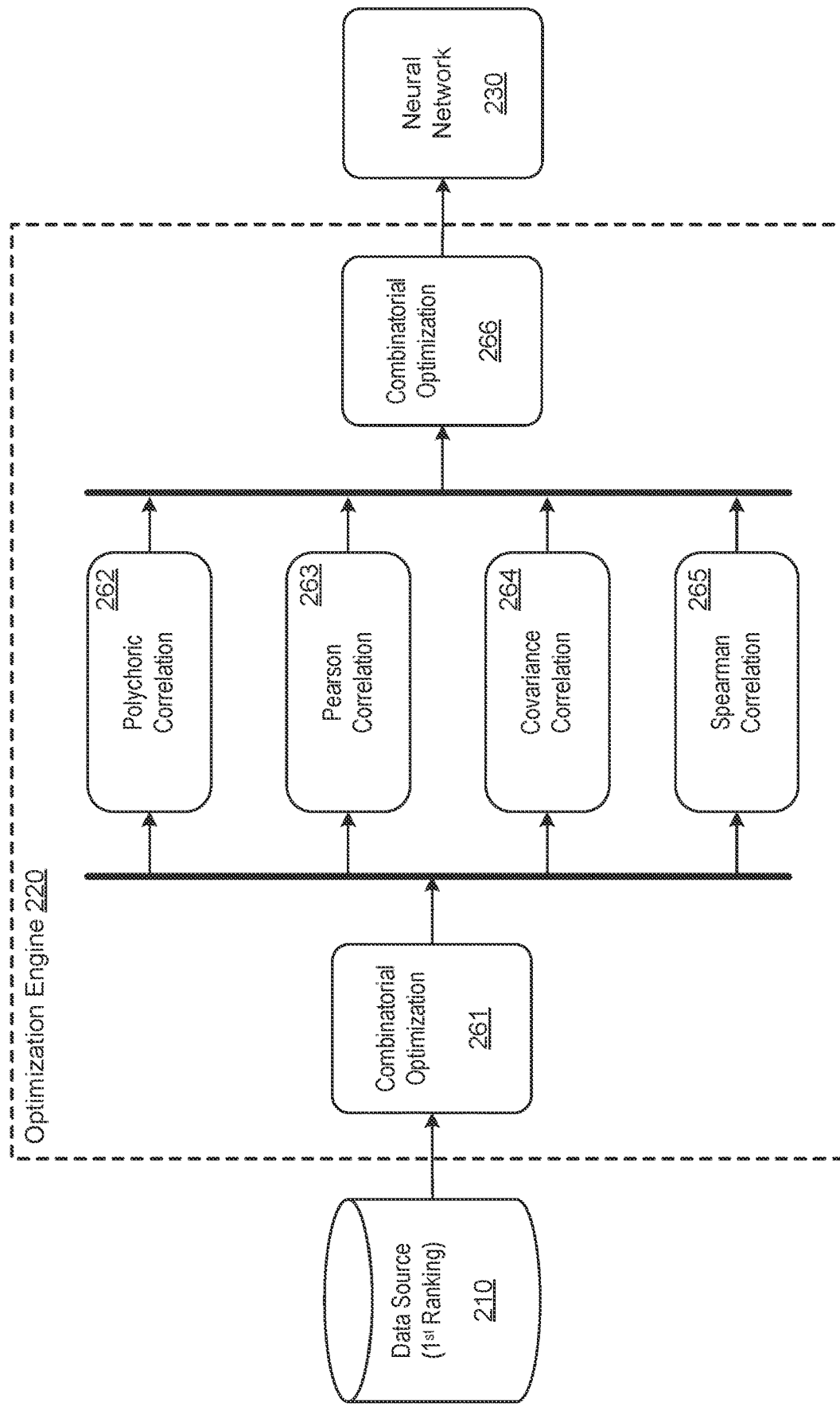

The queries may include natural language queries that can be processed using a natural language processing (NLP) model, such as a machine learning model, artificial intelligence model, or the like. The queries may be sent to an API of a respective data source and may be used to retrieve data such as an ordering of the ranked lists, identifiers of the assets on the list, sources of the data used by the ranking system such as sites, links, etc., and the like. The queried data may be used by an optimization engine 220 to build a list of features for model training. FIGS. 2B and 2C provide further examples of the optimization engine 220 and its components. The list of features may be grouped into a list of triples (strings of values) that can be stored within a resource development framework (RDF), triple store 222, or the like. The triples may contain information that describes the relationships between the variables in the triples.

The purpose of the optimization engine 220 is to minimize uncertainty, minimize a number of features and minimize a residual variable magnitude. The output of the optimization engine 220 is an optimized feature set concatenated with metadata about each of the variables. A host system can retrieve the feature data (triples) from the triple store 222 and input the triples into a neural network 230 which can generate the neural RDF and the explanation sentences 240 for each/all variables involved. The sentences 240 can be output onto a page of a software application or a user interface to provide the user with a descriptive understanding of the reasoning for the rankings.

According to various embodiments, the neural network 230 may convert triples into sentences. For example, triples may be arranged to create a knowledge graph identifying the links between each of the triples using a pre-trained model such as a large language model (LLM). In this example, each work in the triple is converted to its corresponding sentence embedding (from a pre-trained LLM), which is fed to a set of transformers, encoders, decoders, etc., and converted into natural language sentences.

FIGS. 2B-2C illustrate examples of the optimization engine 220 for inferring and comparing the reasoning for ranked lists of assets according to example embodiments. For example, FIG. 2B illustrates a process 250 of the optimization engine 220 generating features for input to a machine learning model such as the neural network 230, and FIG. 2C illustrates a process 260 of the optimization engine 220 relating variables from a ranked list of assets to variables of other ranked lists of assets.

Referring to FIG. 2B, for each ranked list of items/assets, associated data sources or stores 210 and 212 are provided, discovered, or mined. For simplicity, only one data store 210 is shown in FIGS. 2B and 2C, but it should be appreciated that more than one data store and more than one ranked list of assets from the same domain may be compared. Here, the "domain" may refer to a type of sport (e.g., hockey, basketball, baseball, football, tennis, soccer, etc.), a type of game (e.g., Fantasy Football, etc.), a type of product (e.g., consumer goods, etc.), or the like. The data sources may include web pages with articles of text. As another example, the data stores may include well-structured databases or third party suppliers. For unstructured sources, articles are indexed with a data retrieval algorithm and searched. The natural language queries are related to the domain and specific entity. For the entities, the optimization engine 220 may perform a search on text within the data source 210 and query for statistics. The text then undergoes extractive summarization so that the most influential text pieces are retrieved. From there, a sentence-level sentiment is determined. In addition, volume statistics are calculated. On the structured data side, each of the variables are combined with sentiment values and volume values resulting in a full data table.

For example, in FIG. 2B, each of the variables and their data pulled from the data source 210 may be sent to a rate classifier 251 and a scale equivalence classifier 252. The rate classifier 251 determines if the variable is ordinal, binary, or a rate. In addition, the scale equivalence classifier 252 may compare a pair of vectors from two variables in vector space to estimate if their scale is the same. Both the rate classifier 251 and the scale classifier 252 identify which derived features to create. A group of variables that are on the scale will go through an arithmetic mean in 253. If variables are of different scales, a geometric mean may be determined in 254. Further, for variables with rates, a harmonic mean determination may be performed in 255. This process continues for groups that contain all the variables, the most important variables for PCA, variable sets without synthesis, and variable sets with synthesis. A combinatorial optimization algorithm 257 in the form of constraint programming with satisfiability solving may identify relationships between variables from different rankings, such as power rankings.

The best solution that optimizes the results of uncertainty quantification (metamodel regression), minimizes feature number, and minimizes residual variable magnitude is then used to generate tuples. The residual variables are used as holders for uncertainty. They are values that are searched and changed to represent the gap or difference between the data sources used to explain power rankings. Now, the best solution from the optimization engine 220 combined with metadata 256 about the variables are sent to a neural network 258 with attention and embeddings. The data is formed into feature vectors about each variable or derived variable and output as a tuple store. A tuple list about a singular variable is then sent to a transformer that writes explanation sentences.

Referring now to FIG. 2C, the process 260 may be used to identify a correlation among different ranked lists of assets (e.g., from the same domain, etc.) based on correlation among variables used by the different ranked lists to derive the rankings. The variables may be identified from the data sources during the initial querying. The variables may include attributes associated with the domain that are used to generate the power rankings. As an example, the domain may be fantasy football. As an example, there may be over twenty-five different features that are used to derive the final rankings, including, but not limited to, yards gained, touchdowns scored, passes caught, yards thrown, rushing attempts, successful field goals, defensive statistics, and the like.

For example, after each ranked list undergoes optimization in the process 250 of FIG. 2B, the system has the best feasible solution to the optimization problem. With each set of features selected that best describe each ranked list, the system relates variables together via combinatorial optimization by the process 260 shown in FIG. 2C. The input data may be passed through a combinatorial optimization 261, and then, using a pairwise procedure, the system measures a Pearson correlation 262, a Spearman correlation 263, a Polychroic correlation 264, and a covariance correlation 265. The four correlation measures are normalized so that they are all on the same scale, where the higher the number, the better the correlation. As a result, the system sums all four correlations together. The sum of the correlations is associated with the pair of variables via another combinatorial optimization 266. This process continues for all pairs of the variables. The system runs a cross-optimization algorithm that optimizes the pairwise correlation scores for a number of feature groups across many ranked lists while minimizing the number of variables. The system outputs several solutions that relate power ranking groups together with variables that have high correlation.

The system may send the groups of features to a neural RDF creator within the triple store 222. Triples describe the relationship between variables and are sent to the transformer 230 that creates sentences that may reference, for example, each power ranking and across power rankings. These results may be displayed via a user interface which orders the lists together and shows the differences. As an example, multiple correlated lists may be displayed side-by-side for comparison.

The example embodiments may communicate with a host platform 320, as shown in the examples of FIGS. 3A-3D. For example, a system 302 may contain the logic for performing the methods and processes described herein, including the optimization engine 220, the neural network 240, and the like. The system 302 may be hosted by or otherwise communicate with the host platform 320 shown in FIGS. 3A-3D. That is, the methods, systems, and processes described herein may interact with the processes and systems that are shown in the examples shown and described in FIGS. 3A-3D.

Figure 3A:
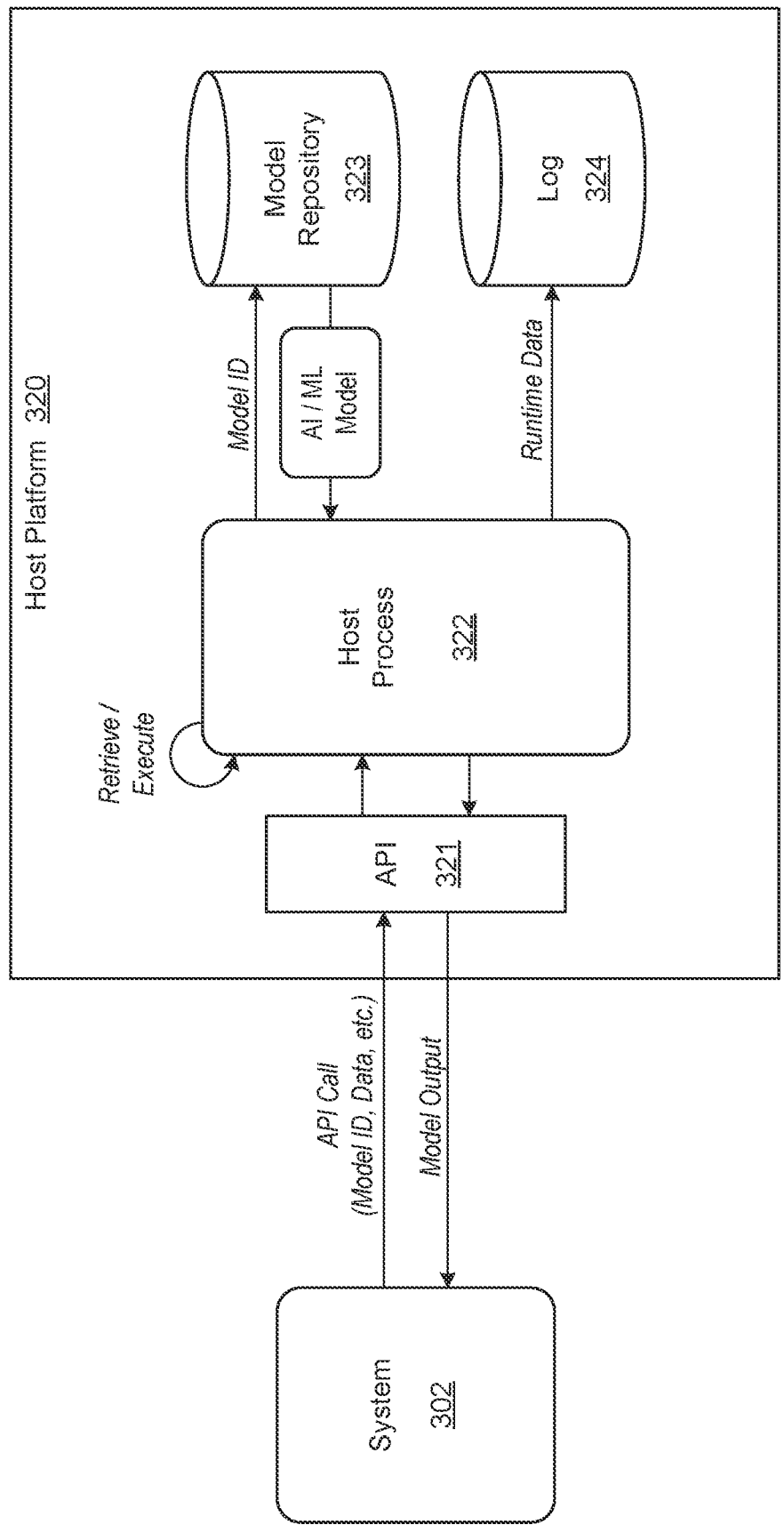
FIGS. 3A-3D are diagrams illustrating processes for training and executing a machine learning model according to example embodiments.

For example, FIG. 3A illustrates a process 300A of executing a machine learning model via the host platform 320. As an example, the machine learning model may refer to the neural network 240 in FIGS. 2A-2C, but embodiments are not limited thereto. The host platform 320 may host a process 322 within a live runtime environment that is accessible to other software programs, applications, and the like, via a network such as the Internet. Here, the host process 322 may have a URL, endpoint, API, etc., which is publicly available on the Internet.

In this example, the host process 322 may control access to and execution of models that are stored within a model repository 323. For example, the models may include artificial intelligence (AI) models, machine learning models, neural networks, or the like. The system 302 may trigger execution of a model from the model repository 323 via submission of a call to an application programming interface (API) 321 of the host process 322. The request may include an identifier of a model or models to be executed, a payload of data (e.g., to be input to the model during execution), and the like. The host process 322 may receive the call from the system 302 and retrieve the corresponding model from the model repository 323, deploy the model within a live runtime environment, execute the model on the input data, and return a result of the execution to the system 302. The result of the execution may include an output result from the execution of the model.

In some embodiments, the input data for executing the model may be pulled by the host process 322 from a data store, such as a RDF triple store described in FIGS. 2A-2C, but embodiments are not limited thereto. Here, the host process 322 may query the RDF triple store for a list of triples related to a particular domain by querying the RDF triple store with an identifier of the domain name, type, scale, etc.

In some embodiments, the system 302 may provide feedback from the output provided by the model. For example, a user may input a confirmation that the prediction output by the model is correct or provide notification that the model is incorrect. This information may be added to the results of execution and stored within a log 324. The log data may include an identifier of the input, an identifier of the output, an identifier of the model used, and feedback from the recipient. This information may be used to subsequently retrain the model, for example, using the model development environment shown in the example of FIG. 3B.

In other embodiments, the system 302 may perform one or more of executing queries on one or more external data stores to retrieve domain data of one or more ranked lists of assets and variables corresponding to the domain data, generating a plurality of feature groups based on the retrieved domain data and variables, wherein the plurality of feature groups correspond to a plurality of features used to generate the one or more ranked lists, converting the plurality of features groups into a plurality of tuples via execution of an optimization engine, transforming the plurality of tuples into a plurality of sentences describing the plurality of feature groups (via execution of a neural network, for example), and displaying the plurality of sentences via a user interface.

Figure 3B:
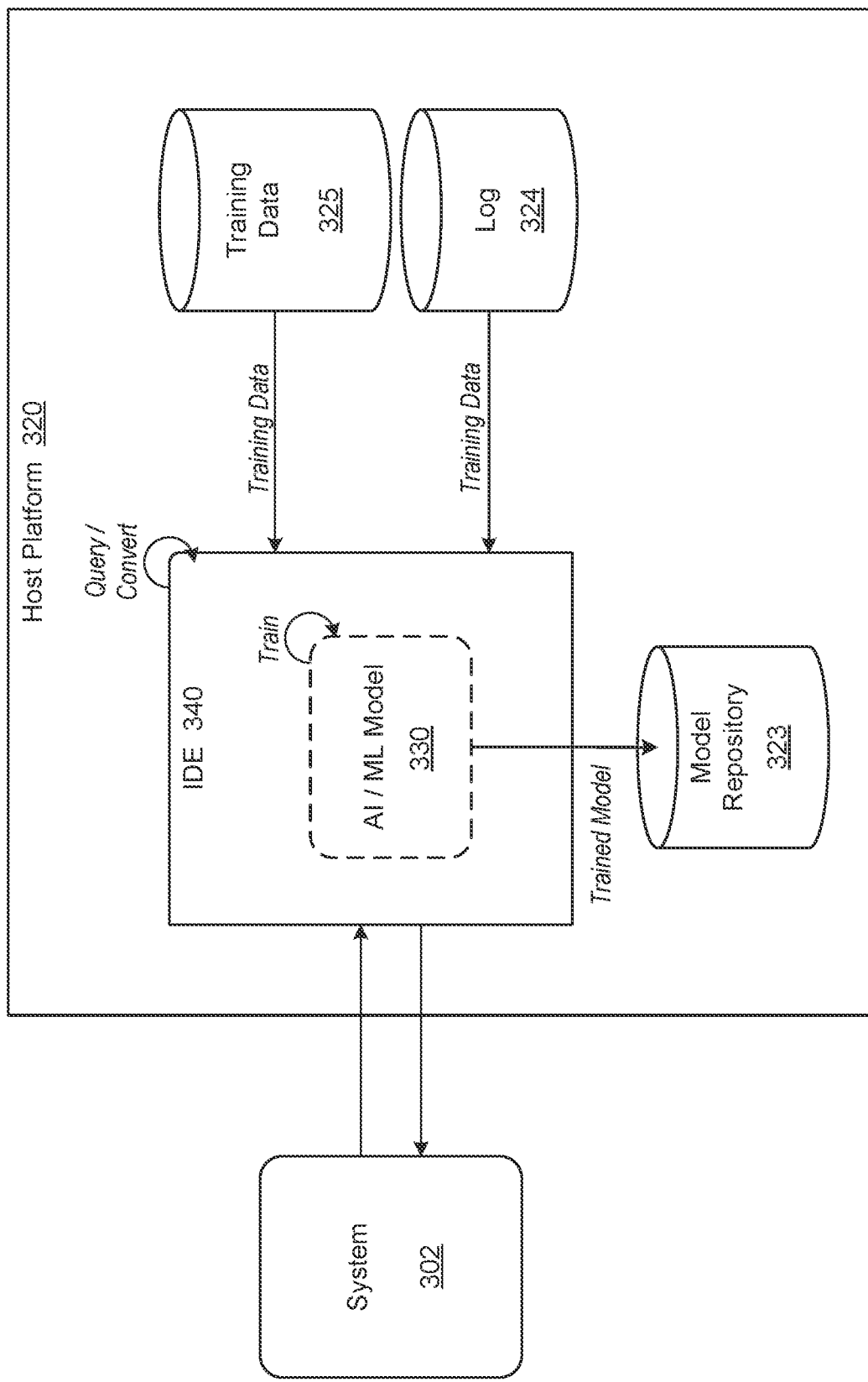

FIG. 3B illustrates a process 300B of training a machine learning model 330 according to example embodiments. As an example, the machine learning model 330 may correspond to the neural network 240 in FIGS. 2A-2C, but embodiments are not limited thereto. Referring to FIG. 3B, the host platform 320 may host an integrated development environment (IDE) 340 where machine learning models, AI models, and the like may be developed, trained, retrained, and the like. In this example, the IDE 340 may include a software application with a user interface accessible by the system 302. For example, the IDE 340 may be embodied as a web application that can be accessed by a device at a network address, URL, etc. As another example, the IDE 340 may be locally or remotely installed on a computing device used by a user.

The system 302 may be used to design a model (via a user interface of the IDE), such as a machine learning model, etc. The model can then be executed/trained based on the training data established via the user interface. For example, the user interface may be used to build a new model. The training data for training such a new model may be provided from a training data store 325, which includes training samples from the web, from customers, and the like. Here, the model is executed on the training data via the host platform 320 to generate a result. The execution of the model causes the model to learn based on the input training data. When the model is fully trained, it may be stored within the model repository 323 via the IDE 340, or the like.

As another example, the IDE 340 may be used to retrain an existing model. Here, the training process may use executional results previously generated/output by the model 330 (including any feedback, etc.) to retrain the model 330. For example, predicted outputs that are identified as accurate, best, good, etc., may be distinguished from outputs that are inaccurate, incorrect, bad, etc. One or more of these types of outputs can be identified and used for retraining the model to help the model provide better outputs.

As a further example, the system 302 can determine a type and a scale of a variable from among the variables and generate the plurality of feature groups based on the type and the scale of the variable. The system 302 can also perform combinatorial optimization on the plurality of feature groups to generate optimized feature groups based on a predefined criteria and determine, via the optimization engine, a subset of feature groups from the optimized feature groups based on feature number and residual variable magnitude, and convert only the subset of feature groups into the plurality of values.

Figure 3C:
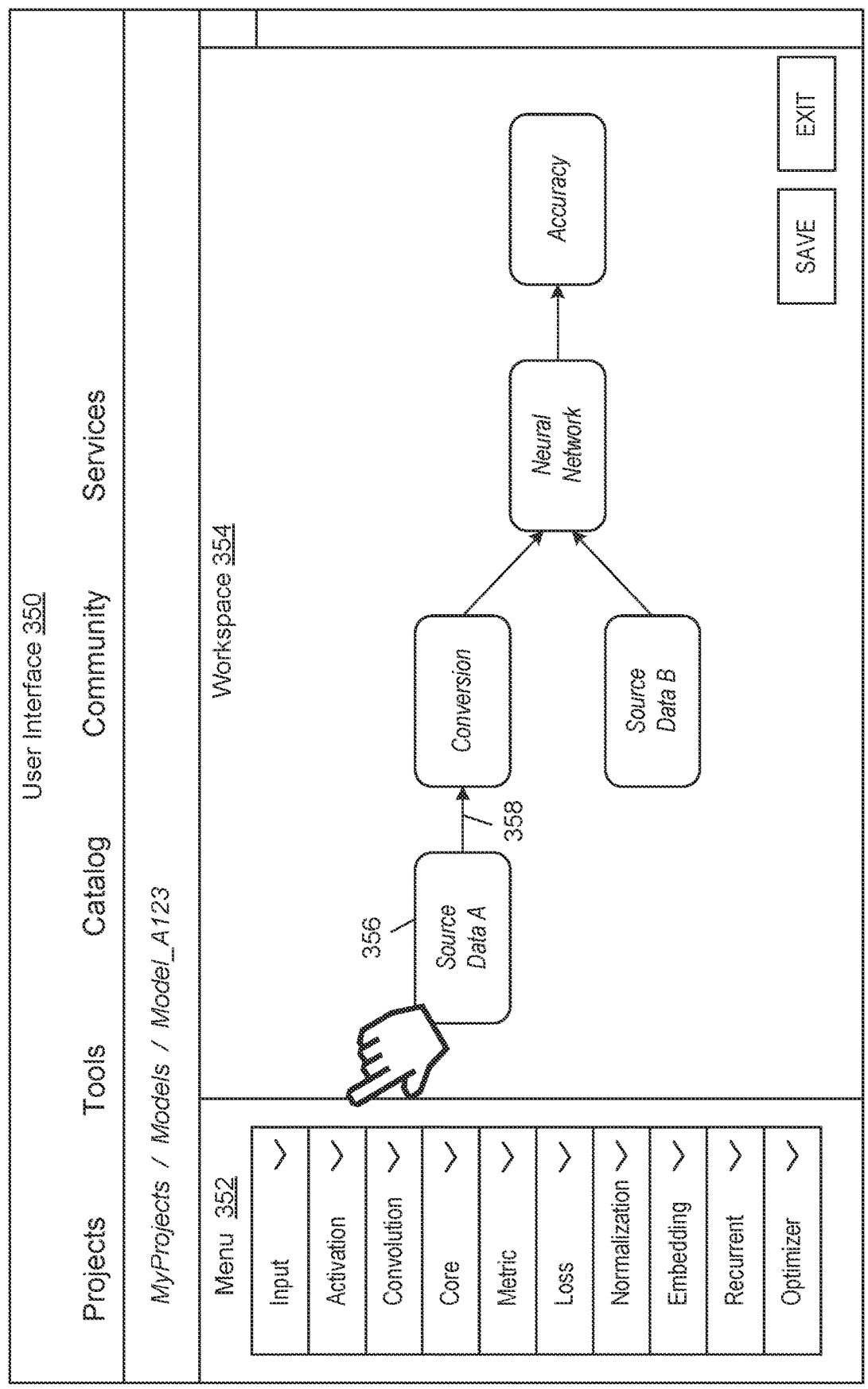

FIG. 3C illustrates a process 300C of designing a new machine learning model via a user interface of the system 302 according to example embodiments. As an example, the system 302 may be output as part of the software application 330, which interacts with the IDE 340 shown in FIG. 3B, however, embodiments are not limited thereto. Referring to FIG. 3C, a user can use an input mechanism from a menu 352 of a user interface 350 to add pieces/components to a model being developed within a workspace 354 of the user interface 350.

In the example of FIG. 3C, the menu 352 includes a plurality of graphical user interface (GUI) menu options which can be selected to drill-down into additional components that can be added into the model design shown in the workspace 354. Here, the GUI menu includes options for adding features such as neural networks, machine learning models, AI models, data sources, conversion processes (e.g., vectorization, encoding, etc.), analytics, etc. The user can continue to add features to the model and connect them using edges or other means to create a flow within the workspace 354. For example, the user may add a node 356 to a diagram of a new model within the workspace 354. For example, the user may connect the node 356 to another node in the diagram via an edge 358, creating a dependency within the diagram. When the user is done, the user can save the model for subsequent training/testing.

In another example, the name of the object can be identified from a web page or a user interface 350 where the object is visible within a browser or the workspace 354 on the user device. A pop-up within the browser or the workspace 354 can be overlayed where the object is visible, which includes an option to navigate to the identified web page corresponding to the alternative object via a rule set. The user interface 350 can display the actions and results described herein including correlating, via the optimization engine, variables included in the subset of feature groups based on a pairwise procedure, generating a plurality of correlation measurements for pairs of variables, normalizing the plurality of correlation measurements for the pairs of variables, combine the normalized plurality of correlation measurements to generate combined correlation measurements, generating the plurality of values based on the combined correlation measurements and executing a cross-optimization algorithm that optimizes the plurality of correlation measurements for the pair of variables and a number of feature groups generated, a minimizes a number of variables.

Figure 3D:
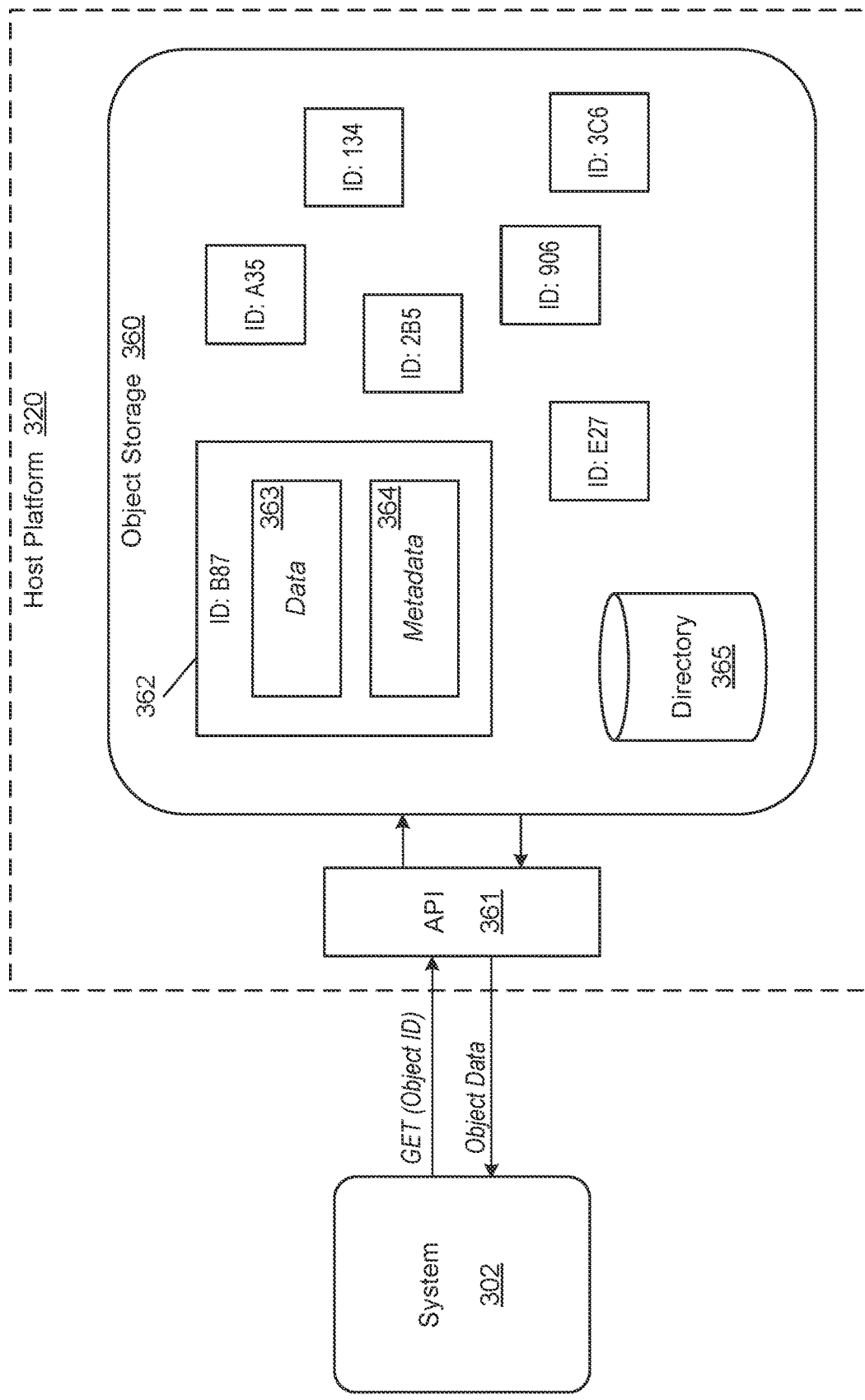

FIG. 3D illustrates a process 300D of accessing an object 362 from an object storage 360 of the host platform 320 according to example embodiments. For example, the object storage 360 may store data that is used by the AI models and machine learning (ML) models 230, 330, training data, expected outputs for testing, training results, and the like. The object storage 360 may also store any other kind of data. Each object may include a unique identifier, a data section 363, and a metadata section 364, which provides for descriptive context associated with the data, including data that can later be extracted for purposes of machine learning. The unique identifier may uniquely identify an object with respect to all other objects in the object storage 360. The data section 363 may include unstructured data such as web pages, digital content, images, audio, text, and the like.

Instead of breaking files into blocks stored on disks in a file system, the object storage 360 handles objects as discrete units of data stored in a structurally flat data environment. Here, the object storage may not use folders, directories, or complex hierarchies. Instead, each object may be a simple, self-contained repository that includes the data, the metadata, and the unique identifier that a client application 302 can use to locate and access it. In this case, the metadata is more descriptive than with a file-based approach. The metadata can be customized with additional context that can later be extracted and leveraged for other purposes, such as data analytics.

The objects that are stored in the object storage 360 may be accessed via an application programming interface (API) 361. The API 361 may be a Hypertext Transfer Protocol (HTTP)-based RESTful API (also known as a RESTful Web service). The API 361 can be used by the client application 302 to query an object's metadata to locate the desired object (data) via the Internet from anywhere on any device. The API 361 may use HTTP commands such as "PUT" or "POST" to upload an object, "GET" to retrieve an object, "DELETE" to remove an object, and the like.

The object storage 360 may provide a directory 365 that uses the metadata of the objects to locate appropriate data files. The directory 365 may contain descriptive information about each object stored in the object storage 360, such as a name, a unique identifier, creation timestamp, collection name, etc. To query the object within the object storage 360, the client application 302 may submit a command, such as an HTTP command, with an identifier of the object 362, a payload, etc. The object storage 360 can store the actions and results described herein including associating two or more lists of ranked assets with one another based on variables used by the two or more lists of ranked assets that have a correlation above a predetermined threshold.

For example, the system 302 may query the object storage 360 via the API 361 with a predefined command to retrieve data from the object storage 360. Here, the query may comprise an identifier of an object from among the objects stored in the object storage 360. The object storage 360 may process the query and return object data from a corresponding object that matches the identifier within the object storage 360. The data may include customer data, personal data, code, model training data, models themselves, or the like.

Figure 4B:
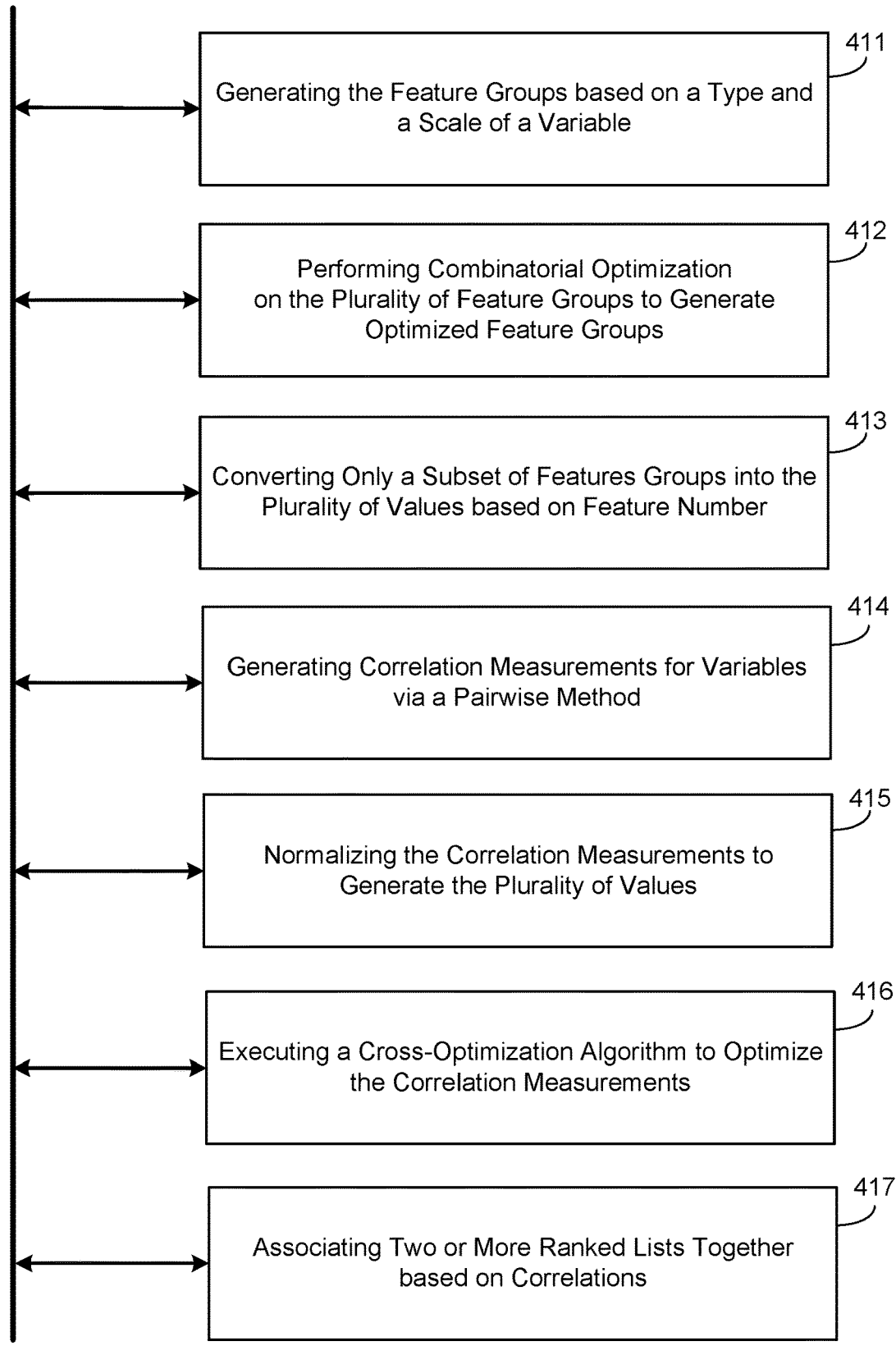
FIG. 4B is a diagram illustrating a method of determining and explaining reasoning for asset rankings according to other example embodiments.

FIG. 4A illustrates a method 400 of determining and explaining reasoning for asset rankings according to example embodiments and FIG. 4B illustrates a method 410 of determining and explaining reasoning for asset rankings according to other example embodiments. Referring to FIG. 4A, in 401, the method may include executing queries on one or more external data stores to retrieve domain data of one or more ranked lists of assets and variables corresponding to the domain data. As an example, the queries may include natural language queries executed based on natural language processing (NLP).

In 402, the method may include generating a plurality of feature groups based on the retrieved domain data and variables, wherein the plurality of feature groups corresponds to a plurality of features used to generate the one or more ranked lists. In 403, the method may include converting the plurality of features groups into a plurality of tuples via execution of an optimization engine. In 404, the method may include transforming the plurality of tuples into a plurality of sentences describing the plurality of feature groups via execution of a neural network. In 405, the method may include displaying the plurality of sentences via a user interface.

Referring now to FIG. 4B, in 411, the method may include determining a type and a scale of a variable from among the variables, and the generating may include generating the plurality of feature groups based on the type and the scale of the variable. In 412, the converting may include performing combinatorial optimization on the plurality of feature groups to generate optimized feature groups based on a predefined criteria. In 413, the converting may further include determining, via the optimization engine, a subset of feature groups from the optimized feature groups based on feature number and residual variable magnitude and converting only the subset of feature groups into the plurality of tuples. In 414, the converting may include correlating, via the optimization engine, variables included in the subset of feature groups based on a pairwise procedure, wherein the correlating comprises generating a plurality of correlation measurements for pairs of variables. In 415, the converting may include normalizing the plurality of correlation measurements for the pairs of variables, combining the normalized plurality of correlation measurements to generate combined correlation measurements, and generating the plurality of tuples based on the combined correlation measurements. In 416, the converting may include executing a cross-optimization algorithm that optimizes the plurality of correlation measurements for the pair of variables and a number of feature groups generated while minimizing a number of variables. In 417, the method may include associating two or more lists of ranked assets with one another based on variables used by the two or more lists of ranked assets that have a correlation above a predetermined threshold.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Although an exemplary embodiment of at least one of a system, method, and computer readable medium has been illustrated in the accompanying drawings and described in the foregoing detailed description, it will be understood that the application is not limited to the embodiments disclosed but is capable of numerous rearrangements, modifications, and substitutions as set forth and defined by the following claims. For example, the system's capabilities of the various figures can be performed by one or more of the modules or components described herein or in a distributed architecture and may include a transmitter, receiver, or pair of both. For example, all or part of the functionality performed by the individual modules may be performed by one or more of these modules. Further, the functionality described herein may be performed at various times and in relation to various events, internal or external, to the modules or components. Also, the information sent between various modules can be sent between the modules via at least one of: a data network, the Internet, a voice network, an Internet Protocol network, a wireless device, a wired device, and/or via a plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone, or any other suitable computing device, or combination of devices. Presenting the above-described functions as being performed by a "system" is not intended to limit the scope of the present application in any way but is intended to provide one example of many embodiments. Indeed, methods, systems, and apparatuses disclosed herein may be implemented in localized and distributed forms consistent with computing technology.

It should be noted that some of the system features described in this specification have been presented as modules in order to more particularly emphasize their implementation independence. For example, a module may be implemented as a hardware circuit comprising custom, very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations, which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction or many instructions and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order and/or with hardware elements in configurations that are different from those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only, and the scope of the application is to be defined solely by the appended claims when considered with a full range of equivalents and modifications (e.g., protocols, hardware devices, software platforms, etc.) thereto.

What is claimed is:

1. An apparatus, comprising:
a processor of an optimization engine that, when executing instructions stored in a memory, is configured to:
retrieve domain data and variables of one or more ranked lists of assets stored in one or more data stores, wherein the domain data identifies types of assets in the one or more ranked lists, and the variables correspond to the domain data and are used to generate the one or more ranked lists;
generate a plurality of feature groups based on the domain data and the variables, wherein the plurality of feature groups corresponds to a plurality of features used to generate the one or more ranked lists;
convert the plurality of features groups into a plurality of tuples;
transform the plurality of tuples into a plurality of sentences that describe the plurality of feature groups; and
provide the plurality of sentences to a user interface for display;
wherein variables included in a subset of feature groups of the plurality of feature groups are correlated based on a pairwise procedure to generate a plurality of correlation measurements for pairs of variables,
wherein the plurality of correlation measurements are normalized for the pairs of variables,
wherein the normalized plurality of correlation measurements are combined to generate combined correlation measurements, and
wherein the plurality of tuples are generated based on the combined correlation measurements.

2. The apparatus of claim 1, wherein the processor is configured to:
determine a type and a scale of a variable from among the variables, and
wherein when the processor generates the plurality of feature groups, the processor is further configured to:
generate the plurality of feature groups based on the type and the scale of the variable.

3. The apparatus of claim 1, wherein when the processor converts the plurality of feature groups into the plurality of tuples, the processor is further configured to:
perform combinatorial optimization on the plurality of feature groups to generate optimized feature groups based on a predefined criteria.

4. The apparatus of claim 1, wherein when the processor converts the plurality of features groups into the plurality of tuples, the processor is configured to:
execute a cross-optimization algorithm that optimizes the plurality of correlation measurements for the pairs of variables and a number of feature groups generated while a number of variables is minimized.

5. The apparatus of claim 1, wherein the processor is configured to:
associate two or more lists of ranked assets with one another based on variables used by the two or more lists of ranked assets that have a correlation above a predetermined threshold.

6. A method, comprising:
retrieving, by a processor, domain data and variables of one or more ranked lists of assets stored in one or more data stores, wherein the domain data identifies types of assets in the one or more ranked lists, and the variables correspond to the domain data and are used to generate the one or more ranked lists;
generating, by the processor, a plurality of feature groups based on the retrieved domain data and the variables, wherein the plurality of feature groups correspond to a plurality of features used to generate the one or more ranked lists;
converting, by the processor, the plurality of features groups into a plurality of tuples;
transforming, by the processor, the plurality of tuples into a plurality of sentences that describe the plurality of feature groups; and
providing, by the processor, the plurality of sentences to a user interface for display;
wherein variables included in a subset of feature groups of the plurality of feature groups are correlated based on a pairwise procedure to generate a plurality of correlation measurements for pairs of variables,
wherein the plurality of correlation measurements are normalized for the pairs of variables,
wherein the normalized plurality of correlation measurements are combined to generate combined correlation measurements, and
wherein the plurality of tuples are generated based on the combined correlation measurements.

7. The method of claim 6, wherein the method further comprises:
determining a type and a scale of a variable from among the variables, and the generating the plurality of feature groups further comprises:
generating the plurality of feature groups based on the type and the scale of the variable.

8. The method of claim 6, wherein the converting the plurality of features groups into the plurality of tuples further comprises:
performing combinatorial optimization on the plurality of feature groups to generate optimized feature groups based on a predefined criteria.

9. The method of claim 6, wherein the converting the plurality of features groups into a plurality of tuples further comprises:
executing a cross-optimization algorithm that optimizes the plurality of correlation measurements for the pairs of variables and a number of feature groups generated while minimizing a number of variables.

10. The method of claim 6, wherein the method further comprises:
associating two or more lists of ranked assets with one another based on variables used by the two or more lists of ranked assets that have a correlation above a predetermined threshold.

11. A computer program product comprising a computer-readable storage medium storing instructions that, when executed by a processor, cause the processor to perform:
retrieving domain data and variables of one or more ranked lists of assets stored in one or more data stores, wherein the domain data identifies types of assets in the one or more ranked lists, and the variables correspond to the domain data and are used to generate the one or more ranked lists;

generating a plurality of feature groups based on the domain data and the variables, wherein the plurality of feature groups correspond to a plurality of features used to generate the one or more ranked lists;

converting the plurality of features groups into a plurality of tuples;

transforming the plurality of tuples into a plurality of sentences that describe the plurality of feature groups; and providing the plurality of sentences to a user interface for display;

wherein variables included in a subset of feature groups of the plurality of feature groups are correlated based on a pairwise procedure to generate a plurality of correlation measurements for pairs of variables, wherein the plurality of correlation measurements are normalized for the pairs of variables, wherein the normalized plurality of correlation measurements are combined to generate combined correlation measurements, and wherein the plurality of tuples are generated based on the combined correlation measurements.

12. The computer program product of claim 11, wherein the instructions further cause the processor to perform:

determining a type and a scale of a variable from among the variables, and the generating the plurality of feature groups further comprises: generating the plurality of feature groups based on the type and the scale of the variable.

13. The computer program product of claim 11, wherein the converting the plurality of features groups into the plurality of tuples further comprises:

performing combinatorial optimization on the plurality of feature groups to generate optimized feature groups based on a predefined criteria.

* * * * *